United States Patent [19]

Watson

[11] Patent Number: 4,525,815
[45] Date of Patent: Jun. 25, 1985

[54] WELL PIPE PERFORATION DETECTOR

[76] Inventor: W. Keith R. Watson, P.O. Box 1537, Rancho Sante Fe, Calif. 92067

[21] Appl. No.: 347,164

[22] Filed: Feb. 9, 1982

[51] Int. Cl.³ .............................................. G01V 1/40
[52] U.S. Cl. ..................................... 367/35; 367/912; 181/106
[58] Field of Search ............... 181/106, 108; 364/422; 367/151, 150, 173, 165, 35, 912

[56] References Cited

U.S. PATENT DOCUMENTS

| | | | |
|---|---|---|---|
| 2,995,925 | 8/1961 | Worlton. | |
| 3,508,436 | 4/1970 | Krautkramer. | |
| 3,561,256 | 2/1971 | Bustin et al.. | |
| 3,590,940 | 7/1971 | Leger | 367/35 |
| 3,646,805 | 3/1972 | Walters. | |
| 4,008,603 | 2/1977 | Paulissen. | |
| 4,051,714 | 10/1977 | Fechter. | |
| 4,063,214 | 12/1977 | Kritz | 367/150 |
| 4,137,777 | 2/1979 | Haverl et al. | 73/620 |
| 4,208,602 | 6/1980 | Stoller | 367/151 |
| 4,212,207 | 7/1980 | Conradi. | |
| 4,255,798 | 3/1981 | Havira | 367/35 |
| 4,274,421 | 6/1981 | Dory | 367/151 |

Primary Examiner—Nelson Moskowitz
Assistant Examiner—Gregory Issing
Attorney, Agent, or Firm—William W. Haefliger

[57] ABSTRACT

Apparatus is provided to detect a discontinuity indicative of a hole in the bore wall of an axially extending tubular member. It comprises:

(a) a carrier to be traveled axially lengthwise in the bore of the tubular member,
(b) an acoustical wave transmitter located on the carrier to transmit acoustical waves for travel toward the bore wall and for reflection therefrom,
(c) an acoustical wave detector at least partially located on the carrier to receive acoustical waves reflected from the bore wall and to detect the presence or absence of such reflected waves, and
(d) a control for providing an indication of such discontinuity, and for controlling the transmission to the detector of the reflected acoustical waves, and characterized in that the detector is controllably exposed to reception of a sequential succession of reflected acoustical waves corresponding to a sequential succession of bore wall portions from which the waves are reflected.

17 Claims, 13 Drawing Figures

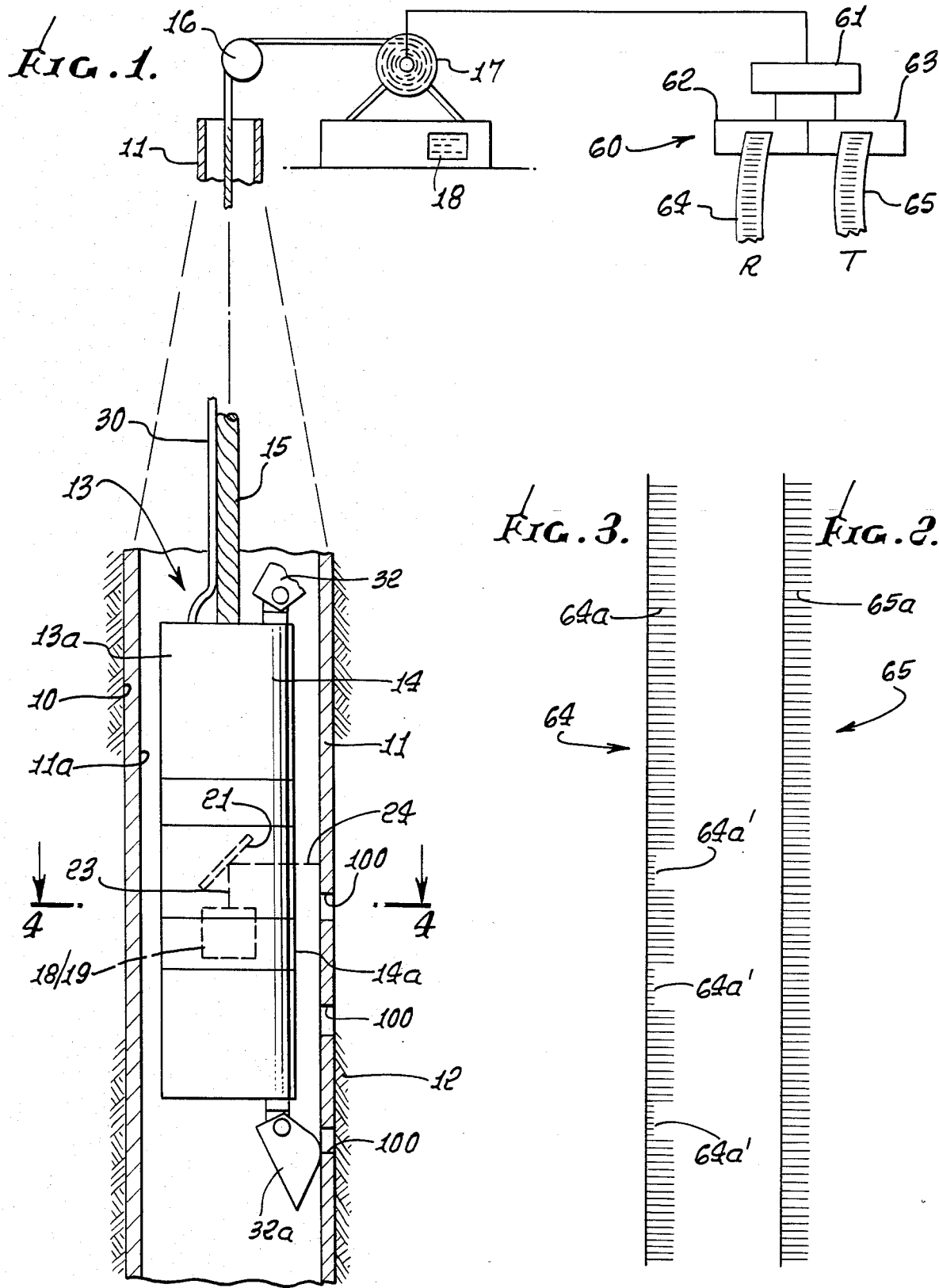

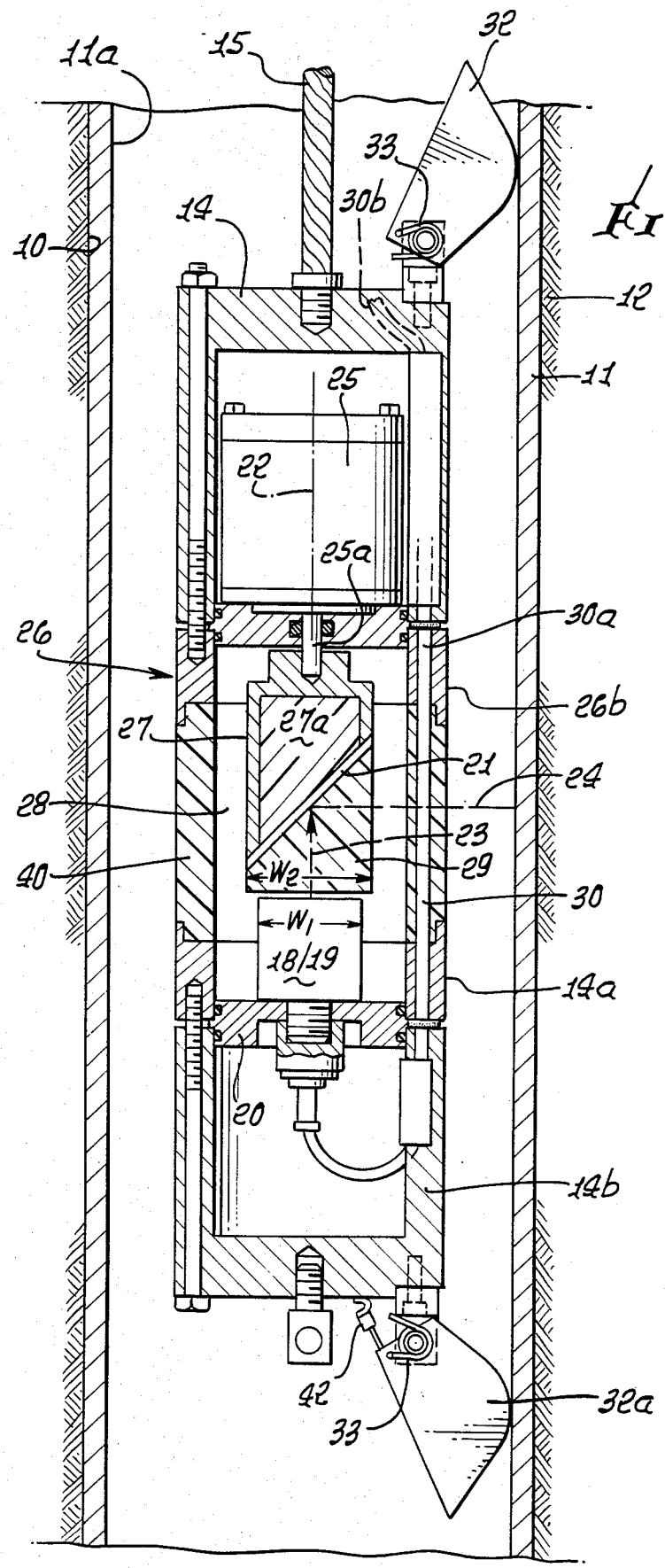
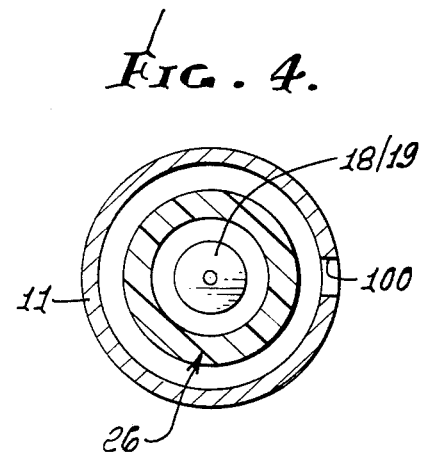
FIG. 5.
FIG. 4.

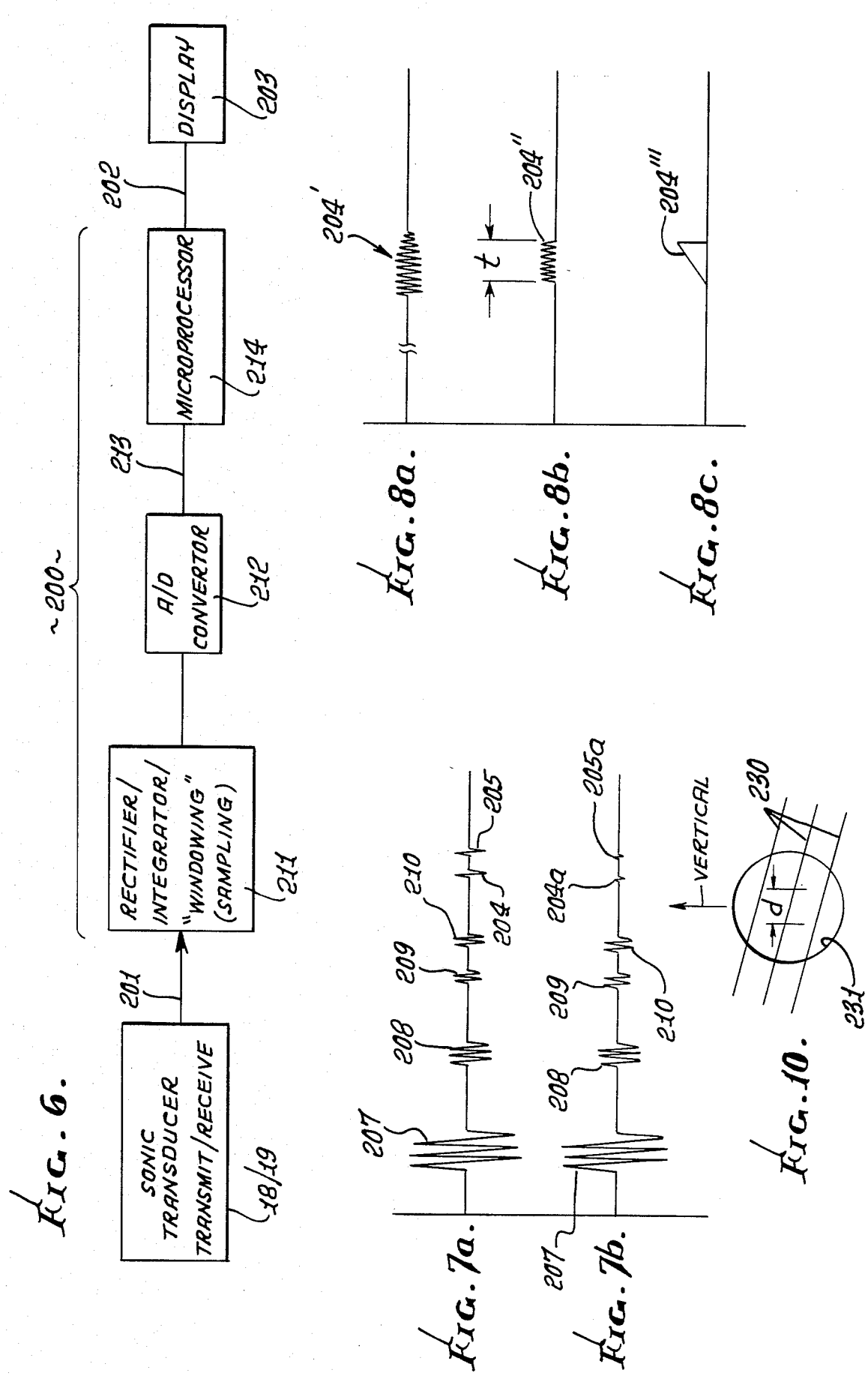

WELL PIPE PERFORATION DETECTOR

BACKGROUND OF THE INVENTION

This invention relates generally to the detection of discontinuities, such as holes for example, in tubular members, and more particularly concerns apparatus adapted to be traveled in a well bore and operable to scan the bore and detect the existence of holes in well casing, pipe or tubing.

It is frequently necessary or desirable to obtain information as to the location or depth of holes, cracks or leaks in well casing. For example, such holes may have been produced, as by firing bullets through the casing, to enhance production of well fluid. Accordingly, it may be desirable later to perforate the casing at a selected vertical spacing from the previously formed holes, and the location of the latter must be determined in order to accurately locate that selected spacing. There are other reasons for the need to locate previously formed holes, perforations or cracks in well pipe.

One device usable to inspect tubular members is disclosed in U.S. Pat. No. 4,212,207 to Conradi. That device employs a rotating reflector to reflect ultrasonic waves transmitted toward and received from a bore of a tubular member. One difficulty with using that device in a well bore containing well fluid such as petroleum is the apparent production of cavitation due to rotation of the reflector, and leading to formation of vapor bubbles in the path of ultrasonic wave transmission, and consequent poor signal detection, or signal to noise readings. In addition, the hydrodynamic drag on the rotating reflector requires undesirably high power input to the motor.

SUMMARY OF THE INVENTION

It is a major object of the invention to provide apparatus and method characterized as meeting the above need, while avoiding difficulties with the described prior device or devices.

Basically, the apparatus of the invention comprises:
(a) a carrier adapted to be traveled axially lengthwise in the bore of an axially extending tubular member such as a well casing containing holes or perforations,
(b) acoustical wave transmitting means located on the carrier to transmit acoustical waves for travel toward the bore wall and reflection therefrom,
(c) acoustical wave detector means (which may be associated with the transmitter) located on the carrier to receive acoustical waves reflected from the bore wall and to detect the presence, absence or modification of such reflected waves, and
(d) means for providing an indication of such discontinuity, and including means for controlling the transmission to the detector means of the reflected acoustical waves. The detector is controllably exposed to reception of a sequential succession of reflected acoustical waves corresponding to a sequential succession of bore wall portions from which the waves are reflected.

In one form of the invention, an acoustical wave reflector is utilized to reflect both transmitted waves traveling toward the well bore, and return waves reflected back from the well bore. That reflector is typically at least partially encapsulated in such manner that its rotation at high speed does not produce fluid cavitation; also, fluid drag is reduced with attendant decrease in rotational power requirements. Further, the provision of a computer controlled stepping motor to rotate the reflector provides precise angular velocity, position control and indexing.

Reflected signal conditioning or processing circuitry may be employed to delay and invert the output, so as to attenuate the output indicative of no holes or flaws in the casing, and to increase the gain of the output indicative of the presence of holes and flows in the casing, and to provide vertical and azimuthal indication of the presence of such holes.

These and other objects and advantages of the invention, as well as the details of illustrative embodiments, will be more fully understood from the following drawings and description, in which:

DRAWING DESCRIPTION

FIG. 1 is a vertical elevation showing one form of the invention;
FIGS. 2 and 3 are wave forms;
FIG. 4 is a horizontal section taken on lines 4—4 of FIG. 1;
FIG. 5 is a vertical elevation showing details of the FIG. 1 form of the invention;
FIG. 6 is a block diagram;
FIGS. 7a and 7b are wave forms;
FIGS. 8a, 8b and 8c are wave forms;
FIG. 9 is a circuit diagram; and
FIG. 10 shows scanning of a hole in a pipe or casing.

DETAILED DESCRIPTION

Figure 9:
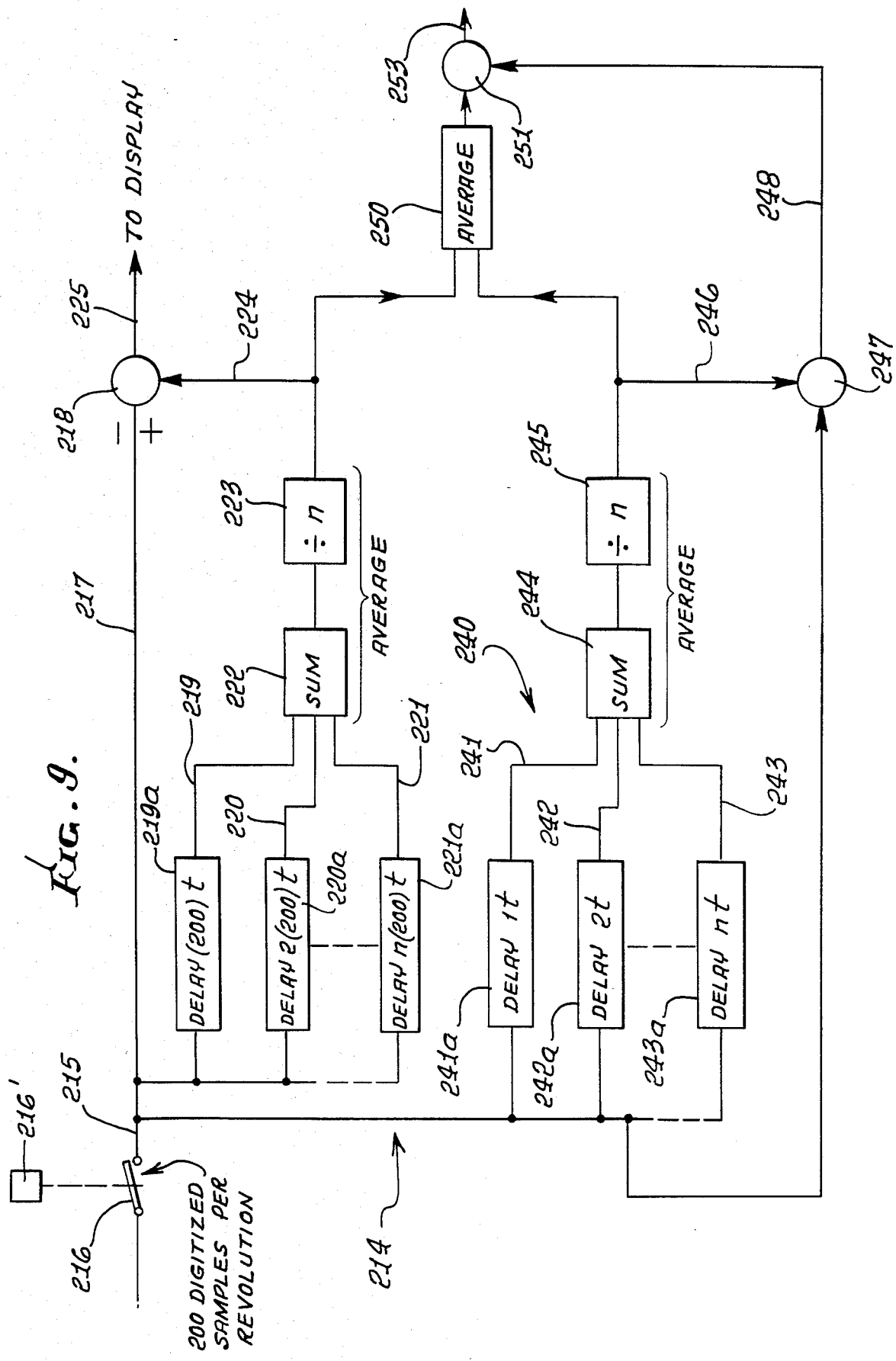

In FIGS. 1 and 4, a well is shown at 10 and is cased at 11. The casing may contain perforations indicated at 100 formed for example by bullets fired through the casing and into the surrounding formation 12, in an effort to initiate fluid flow, i.e. production of oil or gas into the well. At times it is desired to know the exact depth of the perforations, so that the production of additional perforations may be effected in selected vertically spaced relation to the existing perforations, for example.

In accordance with the invention, the apparatus 13 to detect a discontinuity (indicative of a perforation or hole) includes a carrier 13a adapted to be traveled axially lengthwise in the bore 11a of the casing 11 or other tubular member. The carrier may include a body or cap 14 suspended in the well, as via a wire line 15 which is suitably spooled at 16 and 17 at the well surface, with a readout 18 indicative of the depth of the carrier in the well.

The apparatus also includes acoustical wave transmitting means located on the carrier to transmit acoustical waves for travel toward the bore wall for reflection therefrom (or for lack of full reflection, or reduced reflection, in the event of the presence of a hole or discontinuity in the wall); and acoustical wave detector means located on the carrier to receive acoustical waves reflected from the bore wall and to detect the presence or absence of such reflected waves.

As shown in FIG. 5, acoustical wave transmitting means such as transmitter/receiver (or transceiver) 18, 19, transmits acoustical waves for travel toward the bore wall for reflection therefrom (or for lack of full reflection, or reduced reflection, in the event of presence of a hole in the wall). The acoustical wave detector may be associated with the transmitter to detect the presence or absence of the bore wall reflected waves.

As shown, the transmitter-detector may be supported or carried at 20 by the body or housing 14a.

The control means includes an optimized acoustical quarter wave plate or surface 21 angled at about 45° to the body axis 22, to receive transmitted waves traveling at 23 along that axis and to reflect them laterally or radially for travel at 24 toward the bore wall. The waves reflected from that wall travel reversely back along path 24 for reflection by the plate and subsequent travel reversely along path 23 to the detector. The transmission of such waves may be intermittent to allow time for their reflection and reception by detector 19. A drive means such as stepping motor 25 rotates the reflector about axis 22 so that the detector is controllably exposed to reception of a sequential succession of reflected waves corresponding to a sequential succession of bore wall portions from which the waves are reflected. Thus, the bore wall is spirally completely scanned for the presence or absence of holes 101 as the apparatus is traveled lengthwise of the bore.

Means is also provided to at least partially encapsulate the reflector and also to pass or transmit the acoustical waves along paths 23 and 24. Such means may take the form of a synthetic resin cylinder 26 whose axis coincides with axis 22, and which extends parallel to the axis of casing 11. The resin may consist of EPON 815, a product of Shell Oil Co. The cylinder has a straight side wall 26b normal to path 24, (typically acoustically transparent at the chosen frequency, such as 1 MHz) whereby acoustic wave transmission through the cylinder wall is not deviated. Also, the cylinder 26 is supported as shown by body or cap 14. Lower end cap for cylinder 26 appears at 14b. The body and caps may consist of brass.

Motor 25 is also carried by body 14, and its shaft 25a rotates and supports a metallic cup 27, filled with resin 27a as shown, and which in turn supports reflector 21 for rotation in fluid filled zone 28. Plastic such as polyurethane provides acoustical damping, and it may contain lead shot to enhance this effect. Synthetic resin body 29 at the face of the reflector forms a continuation of cup or cylinder 27, whereby there is no turbulence, bubbles or cavitation produced in the fluid in annular zone 28 during reflector rotation. Body 29 may consist of epoxide (EPON 815) resin. The acoustic impedance of fluid in zone 28 is closely matched to that of the synthetic resin 29, to provide optimal acoustic coupling and transmission, interface reflection being minimized. An annular EPON window 40 is provided in the body 14, to pass the acoustic pulses as the plate 21 rotates.

Cables from transducer 18/19 extend at 30 and 30a back upwardly through window 40 and wall 26 and emerge at 30b for extension along side wire line 15 to the surface. Power to motor 25 may be transmitted by cable from the surface.

Devices 32 and 32a on body 14 project for engagement with the casing bore 11a for spacing the apparatus from that bore. Such devices are outwardly urged by springs 33. A sensor 42 may be coupled to pivoted device 32a to sense the pivoting of that device, for providing a signal indicative of pipe bore diameter. Three devices 32 and 32a may be spaced about axis 22, to center the instrument in the pipe or well bore.

Acoustic coupling liquid such as glycerine or silicone oil may be filled into zone 28, whereby ultrasonic pulses are transmitted in liquid, and in solid plastic during their transmission from and to the transceiver 18/19.

Also provided is circuitry connected with the detector to provide an output indicative of the presence of a perforation in the wall of the tubular member, in response to operation of the detector means when a reduced acoustic wave reflection, or no reflection, is received by the detector means. As shown, the circuitry may for example include surface recorder apparatus 60 receiving multiplexed or non-multiplexed signals from the transmitter and detector via a lead in the wire line or cable 15. The recorder includes circuitry 61 to amplify and process the signals, for transmission to printers 62 and 63. The latter incorporate media (such as paper) charts 64 and 65 whose feed is synchronized with the rate of travel, i.e. velocity, of the carrier 13 vertically in the well. Printer 63 prints a horizontal line or bar 65a on strip or chart 65 each time an acoustic pulse is transmitted, the length of the lines being indicative of the amplitude of the acoutic pulse. Printer 62 similarly prints a horizontal line or bar 64a on strip or chart 64 each time a reflected pulse detected, the length of the line being indicative of the amplitude of the detected pulse. FIG. 2 shows that all the bars 65a corresponding to transmitted pulses have approximately the same amplitudes. FIG. 3 shows that nearly all of the reflected and detected pulses have approximately the same amplitudes, the remaining pulses at 64a' having significantly reduced amplitudes. These correspond to the attenuated pulse reflections (or absence of same) from the holes 100 in the casing. Circuitry 61 may incorporate signal inverting elements (amplifiers, for example) to attenuate the lines 64a and amplify the lines 64a', so that detection of the holes may be enhanced.

Referring now to FIG. 6, control circuitry is there shown at 200 to process signal versions of the received acoustical waves, indicated as supplied at 201 to such circuitry. The purpose of such circuitry is, for example, to provide substantially no output at 202 to the display 203 when no discontinuity in the bore wall is detected, and conversely to provide a positive output at 202 to the display when a discontinuity in the bore wall is detected. Normally, as shown in FIG. 7a, the transducer 18/19 will provide positive output signals seen at 204 and 205 indicative of the inner and outer surface respectively of the pipe or casing 11, whereas, as seen in FIG. 7b, the transducer 18/19 will provide very little or no output signals at 204a and 205a when a hole (discontinuity) is detected. Waves 204 and 205 are reflected signals off the pipe inner and outer walls. In FIGS. 7a and 7b, wave 207 is the outgoing (transmit) pulse, wave 208 represents the reflection off the body 29, and waves 209 and 210 are reflections off the inner and outer walls of the housing window 40. Note in this regard, that the width "$\omega_1$" of the "transmit" surface of the transducer 18/19 is less than the width "$\omega_2$" of the "receive" surface of the body 29, so that all transmitted waves are passed into that body for reflection by mirror 21.

The circuitry 200 in FIG. 6 includes sampling means to provide a selected number of samples of the received signal, per each revolution of the reflector. To this end, the circuitry may include rectifier and integrator circuits, as well as sampling circuitry, at 211. FIG. 8a shows a "reflected" signal 204' corresponding for example to reflected acoustic wave 204 (in FIG. 7a). A selected sampled portion of that signal corresponding to time interval "t" shown in FIG. 8a is rectified to produce signal 204", and integrated in FIG. 8c to produce signal 204"'. That sample is then digitized at 212 in FIG. 6, and passed at 213 to microprocessor 214.

Merely for purposes of illustration, let there be 200 samples per revolution, i.e. transceiver 19 and circuitry 200 "looks at" each 1.8° of pipe bore to see if the signal reflected therefrom indicates, or does not indicate, any discontinuity therein. Other sample intervals could also be chosen, provided the interval is small enough to detect ("resolve") a discontinuity.

The microprocessor receives the samples and typically combines them with averaged values of delayed sample values, so as to derive substantially no output at 202 when no discontinuities are detected, and positive output at 202 when discontinuities are in fact present and detected. In the example of FIG. 9, 200 digitized samples per revolution are received at 215. (Note the sample switch 216 driven at 216' at the selected rate, as for example 200 closings per revolution). Values at time t=o pass at 217 to the summing junction 218. Delayed values at t=one revolution, t=two revolutions and up to t=n revolutions are passed at 219-221 (via delay networks 219a-221a) to an averaging circuit (sum 222 and divider 223), and then passed at 224 to junction 218. When no discontinuity is present, the output at 225 is zero because of cancellation (subtraction) of positive inputs at 217 and 224. When a discontinuity is present, one of the inputs at 217 and 224 is almost zero, so that the output at 225 is positive. In this regard, the apparatus is being lifted or lowered in the well, so that the spiral scanning of the well pipe bore is being effected. Note in FIG. 10 spiral scan lines 230 crossing a hole 231 in the pipe wall. The time interval "t" is represented by scan interval "d" in FIG. 10, less than the diameter of the hole. Referring to FIGS. 7a and 7b again, if only one of the acoustic pulses 204 is detected, the interpretation is that the edge of the hole 231 is present.

The azimuthal location of the hole 231 is also detected by means of circuitry shown at 240 in FIG. 9. That circuitry includes delay networks at 241a-243a receiving the sampled values at 215, and whose outputs are passed at 241-243 to an averaging circuit (sum 244 and divider 245). The output at 246 is passed to a summing junction 247 also receiving input from 215, as shown. The junction output at 248 provides a positive indication as to the presence or absence of the pipe wall opening 231 at each interval Δt (corresponding to Δd) i.e. azimuthally. The values at 224 and 246 may be averaged at 250 and summed with output 248 at a junction 251 to provide a further indication—i.e. a "coincidence" indicator at 253 of the vertical and azimuthal presence of a discontinuity, confirming its existence.

We claim:

1. In apparatus to detect a discontinuity indicative of a hole in the bore wall of an axially extending tubular member, the combination comprising
    (a) a carrier adapted to be traveled axially lengthwise in the bore of said member,
    (b) acoustical wave transmitting means located on the carrier to transmit acoustical waves for travel toward the bore wall and reflection therefrom,
    (c) acoustical wave detector means at least partially located on the carrier to receive acoustical waves reflected from the bore wall and to detect the presence or absence of such reflected waves, and
    (d) control means for providing an indication of said discontinuity, and including means for controlling the transmission to the detector means of said reflected acoustical waves and characterized in that the detector means is controllably exposed to reception of a sequential succession of reflected acoustical waves corresponding to a sequential succession of bore wall portions from which the waves are reflected,
    (e) said control means including an acoustical wave reflector, and drive means to rotate the reflector at a location to reflect said (b) means transmitted waves, and to reflect said (c) means reflected waves,
    (f) said reflected acoustical waves including first waves indicative of the absence of a hole in said bore wall, and second waves indicative of the presence of a hole in said bore wall, and wherein said control means includes circuitry to produce attenuated signal versions of said first waves and amplified signal versions of said second waves,
    (g) said circuitry including sampling means to provide a selected number of samples of the received signal, per revolution of the reflector, and a processor to receive said samples and to combine them with averaged values of selected time delayed sample values, thereby to derive substantially no output when no discontinuities are detected, and positive outputs when discontinuities are detected,
    (h) said circuitry including means to receive said samples and process same to derive an azimuthal indication of the location of the detected discontinuity.

2. The apparatus of claim 1 including means supporting said carrier in the bore of the tubular member for lengthwise travel therein.

3. The apparatus of claim 2 wherein said tubular member extends below a reference level, and including means to indicate the extent to which the carrier has been lowered below said level.

4. The apparatus of claim 1 including means at least partially encapsulating said reflector and characterized as transmitting said acoustical waves, said encapsulating means exposed to contact with fluid in the tubular member.

5. The apparatus of claim 1 wherein said encapsulating means consists of synthetic plastic material.

6. The apparatus of claim 4 wherein said encapsulating means is generally cylindrical and contains a fluid zone within which the reflector is rotatable.

7. The apparatus of claim 6 including synthetic plastic material adjacent the reflecting face of said reflector and rotatable therewith in said zone.

8. The apparatus of claim 7 wherein said reflector is located intermediate said drive means and said acoustical wave transmitting means.

9. The apparatus of claim 7 including a synthetic plastic cylinder rotated by the drive means and carrying said reflector.

10. The apparatus of claim 1 wherein said circuitry includes a delay line operable to subtract signal versions of said first waves.

11. The apparatus of claim 5 wherein said carrier includes a tubular portion consisting of synthetic plastic material and defining a zone for reception of said fluid and also for reception of said reflector and encapsulating means therefor.

12. The apparatus of claim 1 wherein said control means includes a reflected wave processor having circuit means to provide an indication of the vertical extent of said discontinuity.

13. The apparatus of claim 1 wherein said control means includes a reflected wave processor having circuit means to provide an indication of the horizontal extent of said discontinuity.

14. The apparatus of claim 1 wherein said control means includes a reflected wave processor having circuit means to provide coincident occurrences of dimensional characteristics to said discontinuity.

15. The apparatus of claim 12 wherein said processor also has other circuit means to provide an indication of the horizontal extent of said discontinuity.

16. The apparatus of claim 1 wherein said circuitry includes signal rectification and integration means whereby said samples are rectified and integrated values.

17. The apparatus of claim 1 wherein said circuitry includes delay network means, averaging means, and summing junction means operatively interconnected to provide an output confirming the presence or absence of a discontinuity, on a coincident vertical and azimuthal basis.

* * * * *